United States Patent [19]

Heinen

[11] Patent Number: 5,065,207
[45] Date of Patent: Nov. 12, 1991

[54] OPTOELECTRONIC CIRCUIT WITH DIODES AND WAVEGUIDES

[75] Inventor: Jochen Heinen, Haar, Fed. Rep. of Germany

[73] Assignee: Siemens Aktiengesellschaft, Munich, Fed. Rep. of Germany

[21] Appl. No.: 655,138

[22] Filed: Feb. 5, 1991

[30] Foreign Application Priority Data

May 28, 1990 [DE] Fed. Rep. of Germany ....... 4017157

[51] Int. Cl.$^5$ ............................................ H01L 27/14
[52] U.S. Cl. ...................................... 357/30; 357/16; 357/19; 385/14
[58] Field of Search ................ 357/30 P, 30 L, 30 E, 357/30 B, 16, 19; 350/96.12, 96.13, 96.14, 96.11

[56] References Cited

U.S. PATENT DOCUMENTS 4,787,691 11/1988 Lorenzo et al. ............. 350/96.14 X
4,835,575 5/1989 Plihal ............................ 357/19 X
5,004,447 4/1991 Soref ............................ 357/30 L X
5,013,113 5/1991 Soref ............................ 350/96.14 X

FOREIGN PATENT DOCUMENTS 1047910 3/1986 Japan ................................. 350/96.13
1200233 8/1989 Japan ................................. 350/96.13

OTHER PUBLICATIONS

Ito et al., "Carrier-Injection-Type Optical Switch in GaAs with a 1.06-1.55 μm Wavelength Range," *Appl. Phys. Lett.* 54(2), Jan. 9, 1989, pp. 134-136.

Primary Examiner—William Mintel
Attorney, Agent, or Firm—Hill, Van Santen, Steadman & Simpson

[57] ABSTRACT

Optoelectronic circuit in a semiconductor component having a branching waveguide. A respective optical amplifier constructed as a diode is integrated in each branch of this waveguide and the doping of the materials surrounding the active layer of these diodes is selected such that each diode can also be separately operated as a photodetector without transverse currents arising between the diodes.

12 Claims, 1 Drawing Sheet

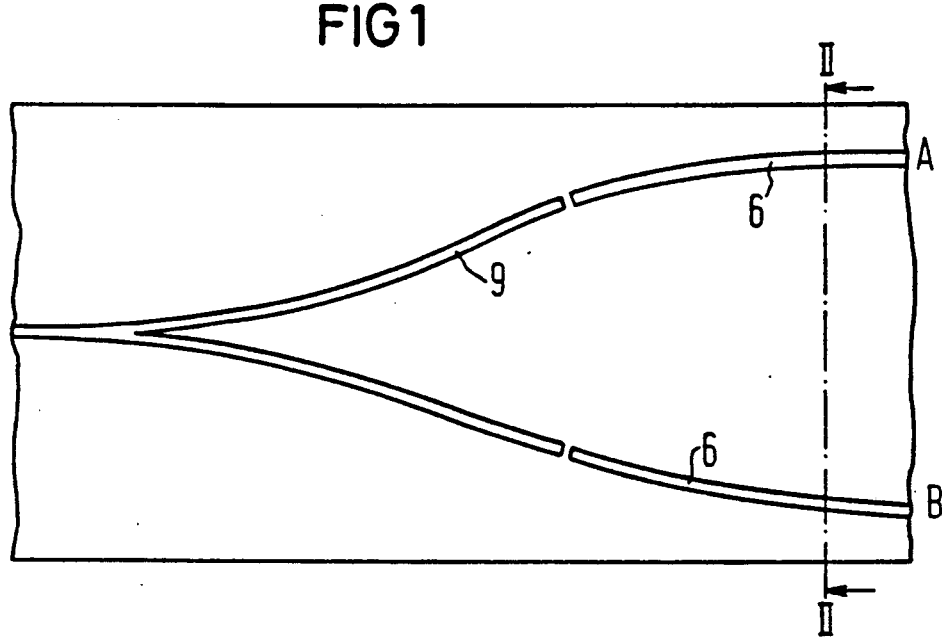
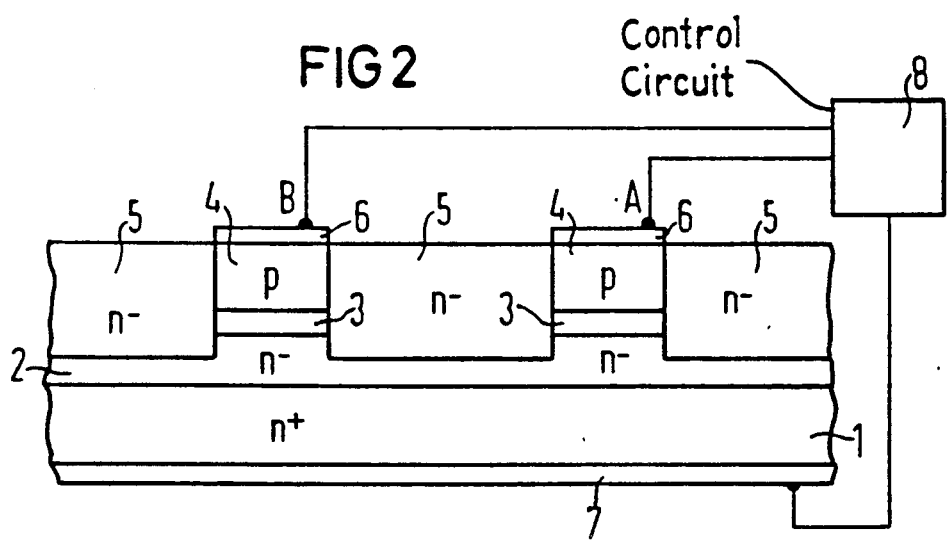

OPTOELECTRONIC CIRCUIT WITH DIODES AND WAVEGUIDES

BACKGROUND OF THE INVENTION

In optical communication transmission systems having optical fibers, a link switching function is required at network nodes in any network configuration. An optical signal that is conducted to the node via a communication link fiber should be used for the switching. It is conceivable to transmit this switching signal with a wavelength differing from that of the communication channel or to send it in the communication channel as a chronologically coded instruction. For this second possibility, a module for a network configuration must be able to fundamentally execute the following functions: to function as an optoelectronic detector that receives a small part of the incoming signal and forwards it for instruction decoding; to function as an optical switch that switches the optical path from one branch to another; and to function as an amplifier that at least compensates for losses that necessarily occur in these components during infeed and outfeed of the light. The detection switching, amplifier and waveguide functions can be fundamentally realized with III-V semiconductor components.

A monolithically integrated structure of these function elements in one optoelectronic integrated circuit (OEIC) is not known in the prior art. A monolithic integration of a network configuration module would have the advantage of minimum complexity and minimum structural length. Due to the single-mode silica fibers and due to wavelengths in the range from 1.3 μm through 1.55 μm that are essentially employed in optical communication technology, such an optoelectronic integrated circuit of a network configuration module based on semiconductor material of the system InP/InGaAsP/InGaAlAs would be especially advantageous.

SUMMARY OF THE INVENTION

An object of the present invention is to provide a monolithically integrated, optoelectronic amplifier circuit which functions as a network configuration module.

This object is achieved by an optoelectronic circuit in a semiconductor component having a branching waveguide, whereby a respective optical amplifier constructed as a diode is integrated in two branches of this waveguide. In the optoelectronic circuit each diode has an active layer that is transversely arranged between a first confinement layer doped for a first conductivity type and a second confinement layer doped for a second conductivity type and that is laterally limited by a third confinement layer. The second confinement layer is completely interrupted by the third confinement layer at least in the region between the diodes.

A first metal contact is provided for an electrical connection to the first confinement layer and a separate, second metal contact for an electrical connection to the second confinement layer is provided for every diode. The third confinement layer is doped as highly as required for the suppression of disturbing transverse currents, being doped for the first conductivity type at least in the region between the diodes. The waveguide is fashioned as a passive waveguide in the region outside the diodes and this passive waveguide is coupled to the active layer of the diodes. The same material as used for the material of the active layer of the diodes is provided for the waveguide in the region outside the diodes. A third metal contact that is substantially electrically insulated from each of the second metal contacts of the diodes is provided for an injection of current into the waveguide. In the preferred embodiment the doping of the first confinement layer is below $2 \times 10^{17}$ cm$^{-3}$.

In a further development of the present invention a control circuit is connected to the first metal contact and to each of the second metal contacts. This control circuit allows the operation of respectively one diode as an amplifier and another diode as a photodetector. This control circuit recognizes a switching signal received from the diode respectively operated as the photodetector and, given reception of this switching signal, switches the diode previously operated as the amplifier to operation as the photodetector and switches the diode previously operated as the photodetector to operation as the amplifier.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 depicts the network configuration module of the present invention in a plan view wherein the course of the waveguides is visible; and FIG. 2 is a cross-sectional view of the present invention shown in FIG. 1.

DESCRIPTION OF THE PREFERRED EMBODIMENT

The crux of the present invention is constructing specific diodes that are integrated in a waveguide as an optoelectronic amplifier such that they also function as a photodetector given appropriate electrical polarization reversal. The complete network configuration module function with the exception of the purely electronic evaluation and drive part can then be achieved with an arrangement that is composed of a branching waveguide, composed of a material that is transparent for the radiation to be conducted, and of two suitable optoelectronic amplifier diodes in every output branch of the waveguide.

FIG. 1 is a plan view of a semiconductor component of the present invention having the optoelectronic circuit integrated therein. Reference metal contacts 6 and 9 are applied onto the surface of the semiconductor material above the waveguides. Two amplifier diodes, A and B, in FIG. 1 are integrated in the two branches of the waveguide. FIG. 2 shows a cross section through this arrangement indicated by the broken section line in FIG. 1. A first confinement layer 2, strip-shaped active layer 3 that is. respectively laterally limited for each diode, a second confinement layer 4 and a third confinement layer 5 are grown onto a substrate 1. The active layer 3 can have a quantum-well structure. The second confinement layer 4 is laterally limited to the strip-shaped regions occupied by the active layer 3 by the third confinement layer 5. This limitation occurs with the third confinement layer 5 in that it simultaneously fills out the regions situated between the waveguides.

A first metal contact 7 is applied onto the substrate 1. A strip-shaped, second metal contact 6 is applied separately above the active layer 3 for each, diode. The first confinement layer 2 and the third confinement layer 5 are each respectively lightly n-conductively doped. The second confinement layer is p-conductively doped. The operational sign of the dopings can also be reversed. What is critical for the present invention is that the diodes (for the dual functions as an amplifier on the one hand and as a photodetector on the other hand) are composed of a nominally undoped active layer 3 between a first confinement layer that is lightly doped for a first conductivity type and a second confinement layer 4 that is doped for a second conductivity type.

The radiation that is divided into two parts at the branching of the waveguide proceeds to the diodes A and B. When the message is intended to pass the output of diode A, only the diode A is operated as an amplifier. The active layer 3 of the diodes is absorbent for the wavelength under consideration. The respective diode is therefore only transmissive for the radiation when it is operated as an amplifier with an operating current in a conducting direction. When, in the present example, diode B is not operated as an amplifier, but is either polarized in inhibiting direction or is operated at a voltage of zero volts, it represents a highly absorbent waveguide. This diode B then operates as a photodetector.

The length of the diodes is dimensioned such that substantial absorption of the radiation occurs before the radiation reaches the output of the diode. In this switch condition, the diode B can receive a signal that can be decoded as a switching signal. This switching signal can be conducted to an external control circuit 8 (see FIG. 2), whereupon this control circuit initiates a switching of diode A from amplifier operation to detector operation and a switching of diode B from detector operation to amplifier operation. A voltage in a conducting direction is thereby applied to the diode B, whereas diode A now operates without a voltage or with a voltage in an inhibiting direction. Diode A now functions as a photodetector that can receive an appropriate switching signal for switching into the opposite direction. When this signal arrives in diode A, now operated as a photodetector, the following control circuit 8 initiates a repeated switching of diode A to amplifier operation and of diode B to detector operation.

A separation of the potentials of the two diodes must be guaranteed for the alternative functioning of the diodes as detectors and amplifiers, since transverse currents would otherwise appear through the semiconductor material between the two diodes. An electrical separation of the two diodes can be achieved by different doping of the second confinement layer 4 and of the third confinement layer 5 with a double epitaxy as is preferably required for the manufacture of the semiconductor layer sequence and for the lateral structuring of the waveguides. To this end, the third confinement layer 5 is lightly doped for electrical conduction of the first conductivity type (n-type in FIG. 2).

So that a blocking voltage of a few volts (usually a maximum of 10 volts) can be applied to every diode for operation as a photodiode without having premature current breakdowns occurring in the semiconductor material, the n-doping of the pn-junction is selected lower than is usual in optical amplifiers. The lower limit for the doping in amplifiers usually is $2 \times 10^{17}$ cm$^{-3}$. In the described exemplary embodiment, the n-doping of the first confinement layer 2 is therefore preferably selected to be below $2 \times 10^{17}$ cm$^{-3}$.

An embodiment of the optoelectronic integrated circuit of the network configuration module of the present invention comprises a passive waveguide region of a semiconductor material that is transparent for the intended wavelength range of 1.3 μm to 1.55 μm. This passive waveguide is coupled to the active layer 3 of the diodes representing the active region. For example, this active layer 3 is composed of quaternary material.

An alternative embodiment of the optoelectric integrated circuit of the network configuration module can also be constructed of a semiconductor wafer having uniformly distributed material provided for the active operation. That part of the waveguides situated outside of the diodes must then also be supplied with an operating voltage, being provided via a third metal contact 9 (see FIG. 1). As a result, this region of the waveguide becomes amplifying (so to speak, as a pre-amplifier) or is at least injected with current to such an extent that it becomes transparent for the intended wavelength. The attenuation in the narrow transition regions from this waveguide onto the diodes A and B is not critical. Thus, in this embodiment the technologically involved coupling between a passive and an active region is eliminated.

In addition to being utilized in the above-described link switching function, the optoelectronic circuit of the present invention can also be utilized in the operating modes set forth below. When the diode A or diode B is operated as an amplifier in alternation, the component functions as a loss-free optical switch. A switching signal is then supplied, for example, externally to the control circuit 8.

When the diodes A and B in both branches of the waveguide are operated as amplifiers, the component functions as a distributor from one waveguide to two waveguides. The component of the present invention can also be operated simply as a receiver when the diode in one branch is connected as a photodetector.

A further possibility is to detect a signal that is not to be absorbed. To this end, the radiation is divided at the fork of the waveguide. One part is forwarded through the appertaining branch of the waveguide after it has been amplified by the diode integrated therein. The other part is received in the other branch of the waveguide by the diode operated therein as a detector and the signal is detected. In addition, it is possible to combine the aforementioned functions with one another when the logic of the connected circuit 8 is correspondingly extensive.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optoelectronic circuit in a semiconductor component having a branching waveguide having at least two branches, a respective optical amplifier constructed as a diode being integrated in each of the two branches of the waveguide, comprising each diode having an active layer that is transversely arranged between a first confinement layer doped for a first conductivity type and a second confinement layer doped for a second conductivity type and that is laterally limited by a third confinement layer; the second confinement layer being completely interrupted by the third confinement layer at least in a region between the diodes; a first metal contact provided for an electrical connection to the first confinement layer; each of the diodes having a separate, second metal contact provided for an electrical, connection to the second confinement layer; and the third confinement layer being doped to a degree great enough for the suppression of disturbing transverse currents, being doped for the first conductivity type at least in the region between the diodes.

2. The circuit according to claim 1, wherein the waveguide is a passive waveguide in a region outside the diodes; and wherein the passive waveguide is coupled to the active layer of the diodes.

3. The circuit according to claim 1, wherein the same material as used for the material of the active layer of the diodes is provided for the waveguide in the region outside the diodes; and wherein a third metal contact, that is substantially electrically insulated from each of the second metal contacts of the diodes, is provided for an injection of current into the waveguide.

4. The circuit according to claim 1, wherein the doping of the first confinement layer is lower than $2 \times 10^{17}$ cm$^{-3}$.

5. The circuit according to claim 1, wherein a control circuit is connected to the first metal contact and to each of the second metal contacts; wherein the control circuit allows the operation of respectively one diode as an amplifier and another diode as a photodetector; wherein the control circuit is responsive to a switching signal received from the diode respectively operated as the photodetector and, given reception of this switching signal, switches the diode previously operated as an amplifier to operation as a photodetector and switches the diode previously operated as a photodetector to operation as an amplifier.

6. The circuit according to claim 1, wherein a control circuit is connected to the first metal contact and to each of the second metal contacts; and wherein this control circuit is provided for the operation of one diode as an amplifier and another diode as a detector.

7. An optoelectronic circuit in a semiconductor component having a branching waveguide having at least two branches, a respective optical amplifier constructed as a diode being integrated in each of the two branches of the waveguide, comprising each diode having an active, layer that is transversely arranged between a first confinement layer, doped for a first conductivity type and a second confinement layer doped for a second conductivity type and that is laterally limited by a third confinement layer; the second confinement layer being completely interrupted by the third confinement layer at least in a region between the diodes; a first metal contact provided for an electrical connection to the first confinement layer; each of the diodes having a separate, second metal contact provided for an electrical connection to the second confinement layer; the third confinement layer being doped to a degree great enough for the suppression of disturbing transverse currents, being doped for the first conductivity type at least in the region between the diodes; the waveguide being a passive waveguide in a region outside the diodes and coupled to the active layer of the diodes, the same material as used for the material of the active layer of the diodes being provided for the waveguide in the region outside the diodes; and a third metal contact, that is substantially electrically insulated from each of the second metal contacts of the diodes, provided for an injection of current into the waveguide.

8. The circuit according to claim 7, wherein the doping of the first confinement layer is lower than $2 \times 10^{17}$ cm$^{-3}$.

9. An optoelectronic circuit in a semiconductor component having a branching waveguide having at least two branches, a respective optical amplifier constructed as a diode being integrated in each of the two branches of the waveguide, comprising each diode having an active layer that is transversely arranged between a first confinement layer doped for a first conductivity type and a second confinement layer doped for a second conductivity type and that is, laterally limited by a third confinement layer; the second confinement layer being completely interrupted by the third confinement layer at least in a region between the diodes; a first metal contact, provided for an electrical connection to the first confinement layer; each of the diodes having a separate, second metal contact provided for an electrical connection to the second confinement layer; the third confinement layer being doped to a degree great enough for the suppression of disturbing transverse currents, being doped for the first conductivity type at least in the region between the diodes; a control circuit connected to the first metal contact and to each of the second metal contacts, the control circuit providing for operation of respectively one diode as an amplifier and another diode as a photodetector; the control circuit being responsive to a switching signal received from the diode respectively operated as the photodetector and, given reception of this switching signal, the control circuit switching the diode previously operated as an amplifier to operation as a photodetector and switching the diode previously operated as a photodetector to operation as an amplifier.

10. The circuit according to claim 9, wherein the waveguide is a passive waveguide in a region outside the diodes; and wherein the passive waveguide is coupled to the active layer of the diodes.

11. The circuit according to claim 9, wherein the same material as used for the material of the active layer of the diodes is provided for the waveguide in the region outside the diodes; and wherein a third metal contact, that is substantially electrically insulated from each of the second metal contacts of the diodes, is provided for an injection of current into th waveguide.

12. The circuit according to claim 9, wherein the doping of the first confinement layer is lower than $2 \times 10^{17}$ cm$^{-3}$.

* * * * *